(12) United States Patent
Kawahito et al.

(10) Patent No.: US 7,058,935 B2
(45) Date of Patent: Jun. 6, 2006

(54) PROGRAM COMPILATION AND OPTIMIZATION

(75) Inventors: Motohiro Kawahito, Sagamihara (JP); Takeshi Ogasawara, Hachioji (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/814,324

(22) Filed: Mar. 21, 2001

(65) Prior Publication Data

US 2002/0059568 A1 May 16, 2002

(30) Foreign Application Priority Data

Apr. 14, 2000 (JP) .............................. 2000-114193

(51) Int. Cl.
*G06F 9/45* (2006.01)
*G06F 9/44* (2006.01)
*G06F 11/00* (2006.01)

(52) U.S. Cl. ...................... 717/151; 717/153; 717/158; 717/140; 712/244; 714/38

(58) Field of Classification Search ................ 717/151, 717/153, 158, 140; 712/244; 714/38
See application file for complete search history.

(56) References Cited

U.S. PATENT DOCUMENTS

| | | | | |
|---|---|---|---|---|
| 5,854,928 A | * | 12/1998 | Buzbee ....................... | 717/158 |
| 5,881,280 A | * | 3/1999 | Gupta et al. ................. | 712/244 |
| 5,907,708 A | * | 5/1999 | Hohensee et al. ........... | 712/244 |
| 5,948,113 A | * | 9/1999 | Johnson et al. ............. | 717/128 |
| 6,247,172 B1 | * | 6/2001 | Dunn et al. .................. | 717/141 |
| 6,301,705 B1 | * | 10/2001 | Doshi et al. ................. | 717/154 |
| 6,363,522 B1 | * | 3/2002 | Click et al. .................. | 717/160 |
| 6,412,109 B1 | * | 6/2002 | Ghosh ......................... | 717/152 |
| 6,487,716 B1 | * | 11/2002 | Choi et al. ................... | 717/159 |
| 6,704,862 B1 | * | 3/2004 | Chaudhry et al. ........... | 712/244 |

OTHER PUBLICATIONS

Ishizaki et al, "Design, Implementation, and Evaluation of Optimizations in a Just-In-Time Compiler", 1999, ACM, p. 119-128.*

R. Klemm, "Practical Guidelines for Boosting Java Server Performance", 1999, ACM, p. 25-34.*

* cited by examiner

*Primary Examiner*—Wei Y. Zhen
*Assistant Examiner*—Qamrun Nahar
(74) *Attorney, Agent, or Firm*—Scully, Scott, Murphy & Presser; Richard Lau, Esq.

(57) ABSTRACT

It is one object of the present invention to provide effective optimization for a program that includes commands that may cause exception processes. A novel compiler for converting source code for a program written in a programming language into object code in a machine language comprises: an optimization execution unit for performing an optimization process for an object program written in a machine language; and a pre-processor and a post-processor for modifying the object program in order to absorb a difference in content between the point of origin of an exception process, which occurs in response to the execution of a command in the object program, and a location whereat the exception process is performed.

2 Claims, 20 Drawing Sheets

```
for (repeat all basic blocks) {
    bbidx = index of basic block
    if (this basic block is the originating point for an exception handler) {
        reach[bbidx].gen = (all TRYs and all local variables corresponding
            to the exception handler) ;
    } else {
        reach[bbidx].gen = ϕ
    }
    reach[bbidx].kill = ϕ
    for (repeat all commands in the basic block in the execution order) {
        if (command == write to local variable) {
            reach[bbidx].kill U= (all TRYs and written local variable numbers) ;
        }
    }
}
```

Fig. 4

$$reach[B].in = (\bigcup_{P \in Pred(B)} reach[P].out) \cup reach[B].gen$$
$$reach[B].out = reach[B].in - reach[B].kill$$

Fig. 5

```
for (repeat all TRYs) USE_VIA_EH_LIST[TRY] = φ;
for (repeat all basic blocks) {
    bbidx = index of basic block ;
    if (reach[bbidx]. in != φ) {
        for (repeat all commands in the basic block in the execution order) {
            switch (command) {
            case write to a local variable :
                reach[bbidx]. in -= (all TRYs and written local variable numbers) ;
                break;
            case read from a local variable :
                for (repeat all TRYs) {
                    if ((TRY, a read local variable number) ∈ reach[bbidx]. in) {
                        USE_VIA_EH_LIST[TRY] U= read local variable number ;
                    }
                }
                break;
            }
        }
    }
}
```

Fig. 6

```
for (repeat all basic blocks) {
    if (basic block is included in a try region) {
        TRY = identification number for a Try Region
        If (USE_VIA_EH_LIST[TRY] != φ) {
            bbidx = index of basic block ;
            for (repeat all commands in the basic block in the execution order) {
                if (command ∈ command that may cause exception) {
                    if (exception handler is present that corresponds to exception that may occur) {
                        < set new exception handler for this command >
                    }
                }
            }
        }
    }
}
```

Fig. 7

```
int MIN_VAL, MAX_VAL;
void sample(int a[][], int size_x, int size_y) {
    int min, max;
    int i, j;
    i = 0;          --- (1)
    j = 0;          --- (2)
    try {
        min = a[i][j];  --- (3)
        max = min;      --- (4)
        i = 0;          --- (5)
        while(i < size_x) {     --- (6)
            j = 0;              --- (7)
            while(j < size_y) { --- (8)
                int val = a[i][j];  --- (9)
                if (min > val) {    --- (10)
                    min = val;      --- (11)
                }
                if (max < val) {    --- (12)
                    max = val;      --- (13)
                }
                j++;                --- (14)
            }
            i++;        --- (15)
        }
    } catch (ArrayIndexOutOfBoundsException e) {
        System.err.println("ArrayIndexOutOfBounds i=" + i + " j=" + j);   --- (16)
        /* error status : min > max */
        max = 0x80000000; --- (17)
        min = 0x7FFFFFFF; --- (18)
    }
    MIN_VAL = min;      --- (19)
    MAX_VAL = max;      --- (20)
}
```

Fig. 9

```
int MIN_VAL, MAX_VAL;
void sample(int a[][], int size_x, int size_y) {
    int min, max;
    int i, j;
    i = 0;          — (1)
    j = 0;          — (2)
    try {
        NULLCHECK a;                — (3.1)
        try {
            SIZECHECK i, a[];       — (3.2)
        } catch(ArrayIndexOutOfBoundsException e) {
            copy i and j variable values to R1 and R2
            goto Handler;
        }
        try {
            SIZECHECK j, a[i];      — (3.3)
        } catch(ArrayIndexOutOfBoundsException e) {
            copy i and j variable values to R1 and R2
            goto Handler;
        }
        min = a[i][j];  — (3.4)
        max = min;  — (4)
        i = 0;          — (5)
        while(i < size_x) {  — (6)
            j = 0;           — (7)
            while(j < size_y) {  — (8)
                try {
                    SIZECHECK i, a[]; — (9.1)
                } catch(ArrayIndexOutOfBoundsException e) {
                    copy i and j variable values to R1 and R2
                    goto Handler;
                }
                try {
                    SIZECHECK j, a[i]; — (9.2)
                } catch(ArrayIndexOutOfBoundsException e) {
                    copy i and j variable values to R1 and R2
                    goto Handler;
                }
                int val = a[i][j];  — (9.3)
                if (min > val) {    — (10)
                    min = val;      — (11)
                }
                if (max < val) {    — (12)
                    max = val;      — (13)
                }
                j++;                — (14)
            }
            i++;            — (15)
        }
    } catch (ArrayIndexOutOfBoundsException e) {
    Handler:
        /* i, j variable values are stored in R1 and R2 */
        System.err.println("ArrayIndexOutOfBounds i=" + i + " j=" + j);  — (16)
        /* error status : min > max */
        max = 0x80000000;   — (17)
        min = 0x7FFFFFFF;   — (18)
    }
    MIN_VAL = min;  — (19)
    MAX_VAL = max;  — (20)
}
```

Fig. 10

```
static int mem_pos;      // variable in a memory
static int mem_a[ ];     // variable in a memory
void SearchPos(int reg_data)
{
    mem_pos = 0;
    while (mem_a[mem_pos] != reg_data) {
        mem_pos ++;
    }
}
```

Fig. 14

```
static int mem_pos;      // variable in a memory
static int mem_a[ ];     // variable in a memory
void SearchPos(int reg_data)
{
    int reg_pos;         // variable in a register
    int reg_a[ ];        // variable in a register mem_pos = 0;

goto entry;
loop:
    reg_pos = mem_pos;
    reg_pos ++;
    mem_pos = reg_pos;
entry:
    reg_pos = mem_pos;
    reg_a = mem_a;
    NULLCHECK reg_a;              // intermediate code that may cause an exception process
    SIZECHECK reg_pos, reg_a[];   // intermediate code that may cause an exception process
    if (reg_a[reg_pos] != reg_data) goto loop;
}
```

Fig. 15

```
static int mem_pos;     // variable in a memory
static int mem_a[];     // variable in a memory
void SearchPos(int reg_data)
{
    int reg_pos;        // variable in a register
    int reg_a[];        // variable in a register reg_pos = 0;
    mem_pos = reg_pos;
    reg_a = mem_a;
    NULLCHECK reg_a;              // intermediate code that may cause an exception process goto entry;                              1601
loop:
    reg_pos ++;
    mem_pos = reg_pos; —①  // this intermediate code can not be moved outside a loop
entry:
    SIZECHECK reg_pos, reg_a[];  // intermediate code that may cause an exception process
    if (reg_a[reg_pos] != reg_data) goto loop;
}
                                           1602
```

Fig. 16

```
static int mem_pos;      // variable in a memory
static int mem_a[];      // variable in a memory
void SearchPos(int reg_data)
{
    int reg_pos;         // variable in a register
    int reg_a[];         // variable in a register reg_pos = 0;
    mem_pos = reg_pos;
    reg_a = mem_a;
    try {
        NULLCHECK reg_a;   // intermediate code that may cause an exception process
    } catch(Throwable t) {
            throw t;
    } goto entry;
loop:
    reg_pos ++;
    mem_pos = reg_pos;
entry:
    try {
        SIZECHECK reg_pos, reg_a[];   // intermediate code that may cause an exception process
                                      //
    } catch(Throwable t) {
            throw t;
    }
    if (reg_a[reg_pos] != reg_data) goto loop;
}
```

1701 — first try/catch block

1702 — second try/catch block

Fig. 17

```
static int mem_pos;      // variable in a memory
static int mem_a[ ];     // variable in a memory
void SearchPos(int reg_data)
{
    int reg_pos;         // variable in a register
    int reg_a[ ];        // variable in a register reg_pos = 0;
    reg_a = mem_a;
    try {
        NULLCHECK reg_a;   // intermediate code that may cause an exception process
    } catch(Throwable t) {
        mem_pos = reg_pos;
        throw t;
    } goto entry;
loop:                    1801
    reg_pos ++;
entry:                         1802
    try {
        SIZECHECK reg_pos, reg_a[];   // intermediate code that may cause an exception process
                                       //
    } catch(Throwable t) {
        mem_pos = reg_pos;    —①
        throw t;
    }
    if (reg_a[reg_pos] != reg_data) goto loop;    1803
    mem_pos = reg_pos;    —②
}
```

Fig. 18

```
try {
    ExceptionCheck;    // intermediate code that may cause an exception process
} catch(Throwable t) {
    throw t;
}
```

```
ExceptionCheck;    // intermediate code that may cause an exception process
```

Fig. 19

```
static int mem_pos;     // variable in a memory
void SearchPos(int reg_data)
{
    mem_pos = 0;
    while(func(mem_pos) != reg_data) {
        mem_pos ++;
    }
}
```

Fig. 20

```
static int mem_pos;     // variable in a memory
void SearchPos(int reg_data)
{
    int reg_pos; // variable in a register
    int reg_ret; // variable in a register reg_pos = 0;

goto entry;
loop:
    reg_pos ++;            ◄──── 2101
entry:
    try {
        reg_ret = func(reg_pos);   ◄──── 2102
    } catch(Throwable t) {
        mem_pos = reg_pos;
        throw t;
    }
    if (reg_ret != reg_data) goto loop;   ◄──── 2103
    mem_pos = reg_pos;
}
```

Fig. 21

```
static int mem_pos;      // variable in a memory
static int mem_a[ ];     // variable in a memory
void SearchPos(int reg_data)
{
    int reg_pos;         // variable in a register
    int reg_a[ ];        // variable in a register reg_pos = 0;
    mem_pos = reg_pos;
    reg_a = mem_a;
    if (NULLCHECK_FAIL reg_a) {    // intermediate code that determines
                                   //   whether an exception process will occur
        NULLCHECK_EXCEPTION reg_a;    // intermediate code that causes an exception process
    } goto entry;
loop:
    reg_pos ++;
    mem_pos = reg_pos,              2601
entry:
    if (SIZECHECK_FAIL reg_pos, reg_a[]) {    // intermediate code that determines
                                              //   whether an exception process will occur
        SIZECHECK_EXCEPTION reg_pos, reg_a[];  // intermediate code that causes an exception process
    }
    if (reg_a[reg_pos] != reg_data) goto loop;   2602
}
```

Fig. 26

```
static int mem_pos;      // variable in a memory
static int mem_a[ ].     // variable in a memory
void SearchPos(int reg_data)
{
    int reg_pos;         // variable in a register
    int reg_a[ ];        // variable in a register reg_pos = 0;
    reg_a = mem_a;
    if (NULLCHECK_FAIL reg_a) {    // intermediate code that determines
                                   //     whether an exception process will occur
        mem_pos = reg_pos;
        NULLCHECK_EXCEPTION reg_a;     // intermediate code that causes an exception process
    } goto entry;
loop:
    reg_pos ++;          ◄──── 2701                    2702
entry:
    if (SIZECHECK_FAIL reg_pos, reg_a[])  {    // intermediate code that determines
                                               //     whether an exception process will occur
        mem_pos = reg_pos;         ─①
        SIZECHECK_EXCEPTION reg_pos, reg_a[];  // intermediate code that causes an exception process
    }
    if (reg_a[reg_pos] != reg_data) goto loop;
    mem_pos = reg_pos;   ─②
}                                               2703
```

Fig. 27

```
if (EXCEPTIONCHECK_FAIL) {    // intermediate code that determines
                              // whether an exception process will occur
    EXCEPTION;                // intermediate code that causes an exception process
}
```

↓

```
ExceptionCheck;  // intermediate code that may cause an exception process
```

Fig. 28

PROGRAM COMPILATION AND OPTIMIZATION

FIELD OF THE INVENTION

The present invention relates to a compiler and an optimization method for performing effective optimization for a program that includes a command that may cause an exception process.

BACKGROUND OF THE INVENTION

Normally, before the source code for a program written in one of the high-level programming languages is finally compiled, code optimization is employed to improve the execution performance and the efficiency of the machine language executable program into which the source code is converted.

When an exception handler has been defined by a user, the specifications for many of the current programming languages require that execution be shifted to the exception handler when an exception process occurs. In addition, the number of commands that may cause an exception process to occur is increased.

When an exception process occurs in a programming language, the current execution status must be ensured. That is, since the exception process can not be ignored, even though the probability that the exception process will be needed is low, a process must be prepared to cope with the exception process. However, when the probability of the performance of an exception process is low, accordingly, the probability of the performance of a process to cope with an exception process is also low, so that the overall operating efficiency is reduced. Therefore, when a program that includes a command that may cause the occurrence of an exception process is compared with a program that does not include such a command, it is found that the optimization effects provided during the compilation of the program are deteriorated.

Further, conventionally, for a function that includes an exception handler, when an ordinary register allocation is performed in a Try region, the location of a variable can not be specified when an exception process occurs. Therefore, basically, a variable that is referred to after reference is made to an exception handler is regarded as having been stored in memory, regardless of whether an exception process was run. Therefore, even when an exception process is not run, the variable must be read from the memory, so that the overall processing speed is reduced.

In order to prevent the erection of an obstacle to the optimization of a program, techniques have been proposed according to which program commands are reduced that may cause the running of an exception process. One of these techniques is, for example, the removal of exception checks using versioning of a loop or data flow analysis. According to this conventional technique, since intermediate code that may cause an exception process can be removed, the costs incurred by the performance of an exception check can be reduced, and the effects obtained by various optimization processes can be increased.

As is described above, for a program written in a programming language that establishes an exception handler for an exception process and shifts the processing to the exception handler, deterioration of optimization effects occurs if a command that may cause the execution of an exception process is included in a program.

A conventional method for reducing program commands that may cause exception processes can be employed to reduce the intermediate code that may also cause exception processes, so that the effects provided by optimization can be increased.

However, according to this conventional method, not all intermediate codes that may cause an exception process can be removed; for example, commands for calling functions can not be removed. Therefore, commands that can not be removed may still adversely affect and reduce the effects of optimization.

It is, therefore, one object of the present invention to provide effective optimization for a program that includes commands that may cause exception processes.

SUMMARY OF THE INVENTION

To achieve these objects, the present invention provides a compiler for converting source code for a program written in a programming language into object code in a machine language, comprises: an optimization execution unit for performing an optimization process for an object program written in a machine language; and a program modification unit for modifying the object program in order to absorb a difference in content between the point of origin of an exception process, which occurs in response to the execution of a command in the object program, and a location whereat the exception process is performed.

With this configuration, an ordinary optimization process can be performed, while taking into account the possibility an exception process may occur, without a special process being performed for a command that could cause an exception process.

If there is a difference in content between the point of origin of an exception process, which occurs in response to the execution of a command in the object program, and a location whereat the exception process is performed, the program modification unit generates compensation code to compensate for the difference, and inserts the compensation code into the object program.

A difference in content between the point of origin of an exception process and the location whereat the exception process is performed is a difference in the allocation of registers or of memory content. In either case, an appropriate compensation code is inserted in consonance with the content of the difference.

The program modification unit includes: a pre-processor for, before the optimization execution unit performs the optimization process, employing a Try node to examine a command that may cause an exception process in the object program to determine whether an exception process has occurred, and a Catch node for performing an inherent process when it is found an exception process has occurred; and a post-processor for examining, in the object program that has been optimized by the optimization execution unit, the command that may cause an exception process to determine whether a difference in content exists between the command that may cause the exception process and a location whereat the exception process is performed, and for, when a difference exists, generating in the Catch node a compensation code, to be used to compensate for the difference, and a code for, after the compensation code is obtained, moving program control to the location whereat the exception process is performed.

When no difference in content exists between the command that may cause an exception process and the location whereat the exception process is performed, the Try node and the Catch node, which are created by the pre-processor, can be deleted.

Before the optimization execution unit performs the optimization process in the object program, the program modification unit divides the command that may cause an exception process into a command portion for determining whether an exception process has occurred, and a command portion for actually causing an exception process. Then, when an exception process occurs, the program modification unit modifies the object program to shift program control to the command portion that actually caused the exception process.

After the modified object program has been optimized, if the code for compensating for a difference in content between the point of-origin of an exception process and the location whereat the exception process was performed is not generated in a block that includes the command that actually caused the exception process, the two parts of the command are synthesized to obtain the original command that existed before division.

When in the object program the command that may cause an exception process consists of a command portion for determining whether an exception process has occurred and a command portion for actually causing an exception process, before the optimization execution unit performs the optimization process, the program modification unit divides the command in the object program that may cause the exception program into the command portion for determining whether an exception process has occurred and the command portion for actually causing an exception process. When an exception process actually occurs, the program modification unit modifies the object program in order to shift program control to the command portion that actually caused the exception process. Whereas when an exception process has not occurred, the optimization execution unit, before performing the optimization process, establishes a Try node for examining the command that may cause an exception process to determine whether an exception process has occurred, and a Catch node for performing an inherent process when an exception process has occurred. Further, in the object program that has been optimized by the optimization execution unit, the program modification unit examines the command that may cause an exception process to determine whether a difference in content exists between the command that may cause the exception process and the location whereat the exception process is performed. When a difference exists, the program modification unit generates, in the Catch node, a compensation code for compensating for the difference and, after the compensation code is obtained, a code for moving program control to the location whereat the exception process was performed.

According to the present invention, a computer system comprises a compiler for converting program source code written in a programming language into object code written in a machine language, wherein the compiler includes: an optimization execution unit for performing an optimization process for an object program written in a machine language; and a program modification unit for modifying the object program in order to absorb a difference in content between the point of origin of an exception process, which occurs in response to the execution of a command in the object program that may cause the exception process, and a location whereat the exception process is performed.

This configuration is preferable because when the computer system compiles a program, it can, while taking into account the occurrence of an exception process, perform an ordinary optimization process, without having to perform a special process for a command that may cause an exception process.

According to the present invention, an optimization method for optimizing a program to increase processing efficiency comprises the steps of: preparing a basic block that includes a portion for examining, in an object program, a command that may cause an exception process to determine whether an exception process has actually occurred, and that includes a command for, when an exception process has occurred, moving program control to a portion whereat the exception process is performed; and generating in the basic block compensation code, when a difference in content exists between the point of origin of the exception process and the portion whereat the exception process is performed, for compensating for the difference.

With this configuration, while taking into account the possibility that an exception process may occur, an ordinary optimization process can be employed without a special process being required for a command that may cause an exception process.

According to the present invention, an optimization method for optimizing a program to increase processing efficiency comprises the steps of: establishing a basic block that includes a Try node for examining, in an object program, a command that may cause an exception process to determine whether an exception process has occurred, and a Catch node for performing an inherent process when an exception process has occurred; performing optimization of the object program wherein the basic block is established; examining the optimized object program to determine whether a difference in content exists between the command that may cause an exception process and a location whereat the exception process is performed; and generating in the Catch node of the basic block when a difference exists, a compensation code for compensating for the difference, and a code for, after the compensation code has been obtained, moving program control to the location whereat the exception process is performed.

Since the basic block is established before the optimization process is performed, and since in order to generate compensation code an examination is conducted after the optimization process has been performed to determine whether a difference in content exists between a command that may cause an exception process and the location whereat the exception process is performed, the difference in content can be appropriately compensated for.

The step of determining whether a difference in content exists between the command that may cause an exception process and the location whereat the exception process is performed includes a step of removing the basic block prepared for the command that may cause an exception process when no difference in content exists.

Since an unnecessary basic block is removed, the amount of optimized object program code can be reduced.

According to the present invention, an optimization method for optimizing a program to increase processing efficiency comprises the steps of: dividing code, in an object program, that may cause an exception process into code for determining whether an exception process has occurred and code for actually causing an exception process; specifying the code obtained at the division step as branches of a control flow graph; designing the control flow graph so that when an exception process occurs, program control is shifted to the code that actually caused the exception process; and performing the optimization process for the object program that has been modified.

The thus modified program includes, as needed, code for compensating for a difference in content between the point of origin of the exception process and the location whereat the exception process is performed. Therefore, effective optimization can be implemented for the modified program.

The optimization method further comprises the steps of: determining whether code for compensating for a difference in content between the point of origin of an exception process and code for actually causing the exception process have been generated in a block that includes code for the actual performance of the exception process after the optimization process has been run; and using the control flow graphs, when the code for compensating for the content difference is not generated, for synthesizing the two code sets to obtain the code arrangement that existed before the code was divided.

Since unnecessary branches are thus returned to their original state, the amount of optimized object program code can be reduced.

According to the present invention, a computer program that permits a computer to optimize an object program comprises: a process for preparing a basic block that includes a portion for examining a command, in an object program, that may cause an exception process, in order to determine whether an exception process has occurred, and that includes a command for, when an exception process has occurred, moving program control to a portion whereat the exception process is performed; and a process for, when a difference in content exists between the point of origin of the exception process and the portion whereat the exception process is performed, generating in the basic block compensation code for compensating for the difference.

With this configuration, a computer in which this program has been installed can effectively optimize a program that includes a command that may cause an exception process.

According to the present invention, a computer executable program comprises: a function for examining a command, in the computer program, that may cause an exception process, to determine whether an exception process has occurred; a function for running an exception process; and a function for, when an exception process has occurred, shifting program control to a portion whereat the exception process is run, and for, when a difference in content exists between the point of origin of the exception process and the portion whereat the exception process is run, compensating for the difference before program control is shifted to the portion whereat the exception process is run.

Even when this program includes a command that may cause an exception process, the program can be optimized, while taking the exception process into account, without a special process being performed for the command. Therefore, the execution speed can be increased.

The function for determining whether an exception process has occurred can be provided by a Try node of a Try-Catch block or by a condition branch.

According to the present invention, a storage medium, on which input means of a computer stores a computer-readable program that permits the computer to perform: a process for preparing a basic block that includes a portion for examining a command, in an object program, that may cause an exception process, in order to determine whether an exception process has occurred, and that includes a command for, when an exception process has occurred, moving program control to a portion whereat the exception process is performed; and a process for, when a difference in content exists between the point of origin of the exception process and the portion whereat the exception process is performed, generating in the basic block compensation code for compensating for the difference.

With this configuration, a computer in which this program has been installed can effectively optimize a program that includes a command that may cause an exception process.

According to the present invention, a program transmission apparatus comprises: storage means for storing a program that permits a computer to perform a process for preparing a basic block that includes a portion for examining a command, in an object program, that may cause an exception process, in order to determine whether an exception process has occurred, and that includes a command for, when an exception process has occurred, moving program control to a portion whereat the exception process is performed, and a process for, when a difference in content exists between the point of origin of the exception process and the portion whereat the exception process is performed, generating in the basic block compensation code for compensating for the difference; and transmission means for reading the program from the storage means and for transmitting the program.

With this configuration, a computer that has downloaded this program can effectively optimize a program that includes a command that may cause an exception process.

DESCRIPTION OF THE DRAWINGS

FIG. 4 is a diagram for explaining an example according to the first embodiment wherein compensation code is inserted to cope with an exception process, and showing an algorithm for calculating a set of elements in a basic block.

FIG. 5 is a diagram for explaining the example according to the first embodiment wherein compensation code is inserted to cope with an exception process, and showing an expression for performing data flow analysis.

FIG. 6 is a diagram for explaining the example according to the first embodiment wherein compensation code is inserted to cope with an exception process, and showing an algorithm for calculating a set of local variables.

FIG. 7 is a diagram for explaining the example according to the first embodiment wherein compensation code is inserted to cope with an exception process, and showing an algorithm for setting a new exception handler for a predetermined command.

FIG. 9 is a diagram showing a sample Java program for calculating the minimum value and the maximum value for an array.

FIG. 10 is a diagram showing a modification effected by inserting compensation code into the program in FIG. 9 in accordance with the first embodiment.

FIG. 14 is a diagram showing a sample Java program.

FIG. 15 is a diagram showing a program obtained by dividing the sample program in FIG. 14 into smaller processing units.

FIG. 16 is a diagram showing the state wherein the program in FIG. 15 is optimized using a conventional technique.

FIG. 17 is a diagram showing the state according to the first embodiment wherein the compensation code is inserted into the program in FIG. 16.

FIG. 18 is a diagram showing the program in FIG. 17 wherein the memory write command is optimized using the partial redundancy elimination algorithm.

FIG. 19 is a diagram showing the state wherein a Try-Catch block is eliminated from the program in FIG. 18.

FIG. 20 is a diagram showing the program wherein the array access portion in the sample program in FIG. 14 is replaced by a function.

FIG. 21 is a diagram showing the state in FIG. 20 wherein compensation code is inserted to optimize the memory write command.

FIG. 26 is a diagram showing the state in accordance with the second embodiment wherein compensation code is inserted into the program in FIG. 16.

FIG. 27 is a diagram showing the state wherein the memory write command in the program in FIG. 26 is optimized by using the partial redundancy elimination algorithm.

FIG. 28 is a diagram showing the state wherein unnecessary branches of the program in FIG. 27 are removed to return it to its state before division.

DESCRIPTION OF PREFERRED EMBODIMENTS

The preferred embodiments of the present invention will now be described while referring to the accompanying drawings. An overview of the present invention will be given first.

And for this and the subsequent explanation, a program written in an object-oriented programming language is employed. It should be noted, however, that the optimization technique of the present invention is not limited to object-oriented programming languages, but is also applicable to modular and other programming languages that are so designed that when there is a user defined exception handler in a program, program control is shifted to the exception handler if an exception process occurs. According to the optimization method of the invention, in a program that includes a command that may cause an exception process, compensation code is generated to absorb a difference (e.g., register allocation or memory contents) that appears, due to optimization, between the point of origin of the exception process and the exception handler (including outside the method). Therefore, when an exception process occurs during the execution of a modified program, the system examines the exception process point of origin to determine whether compensation code is present. If the compensation code is present, program control jumps to the compensation code point instead of to the exception handler, and is thereafter shifted to the exception handler.

Figure 1:
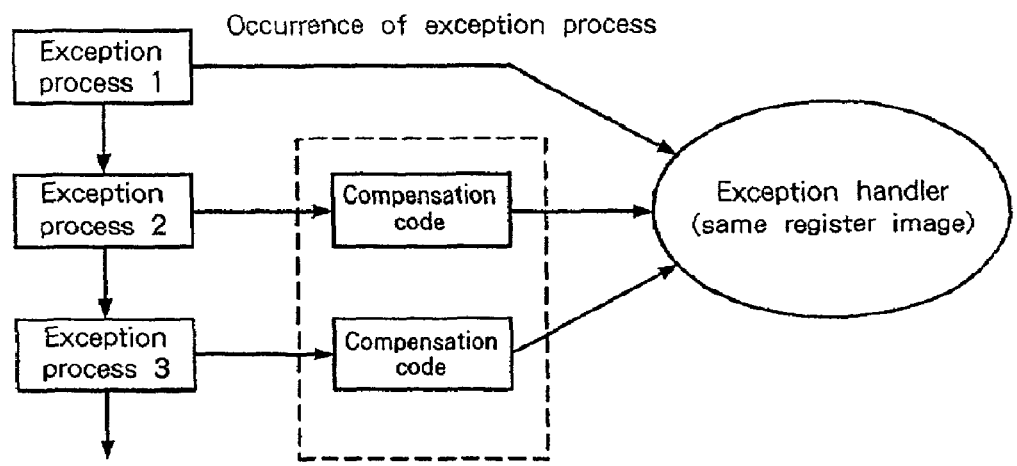
FIG. 1 is a diagram showing the state wherein program control is shifted to an exception handler in response to a command that may cause an exception process.

FIG. 1 is a diagram showing the state wherein, relative to a command that may cause an exception process, program control is moved to an exception handler. For an exception process 1 in FIG. 1, program control moves directly to the exception handler, while no compensation code is required, even when the exception process occurs. Whereas for exception processes 2 and 3, program control is shifted through compensation codes to the exception handler in order to absorb the difference between the point of origin of the exception occurrence points and the exception handler. As is described above, since program control is shifted from the exception process occurrence point to the exception handler either directly or through the compensation code, as needed, the exception handler can ensure that the same register image will be used for all the exception processes, 1, 2 and 3.

Therefore, a special process, such as the reading of a variable from a memory while taking into account the occurrence of the exception process, need not be performed for a command that may cause an exception process. And further, since optimization can be performed without employing special processing for a command that may cause an exception process, optimization efficiency when an exception process does not occur can be improved, and the overall processing speed can be increased.

For the insertion of compensation code, a basic block must be created in a program and the compensation code must be generated in the basic block. As methods for preparing a location whereat compensation code is inserted into a block, there is one method that involves the creation of a Try-Catch block and another method whereof the clear setting of a condition branch is required. These methods will now be described separately.

FIRST EMBODIMENT

Figure 2:
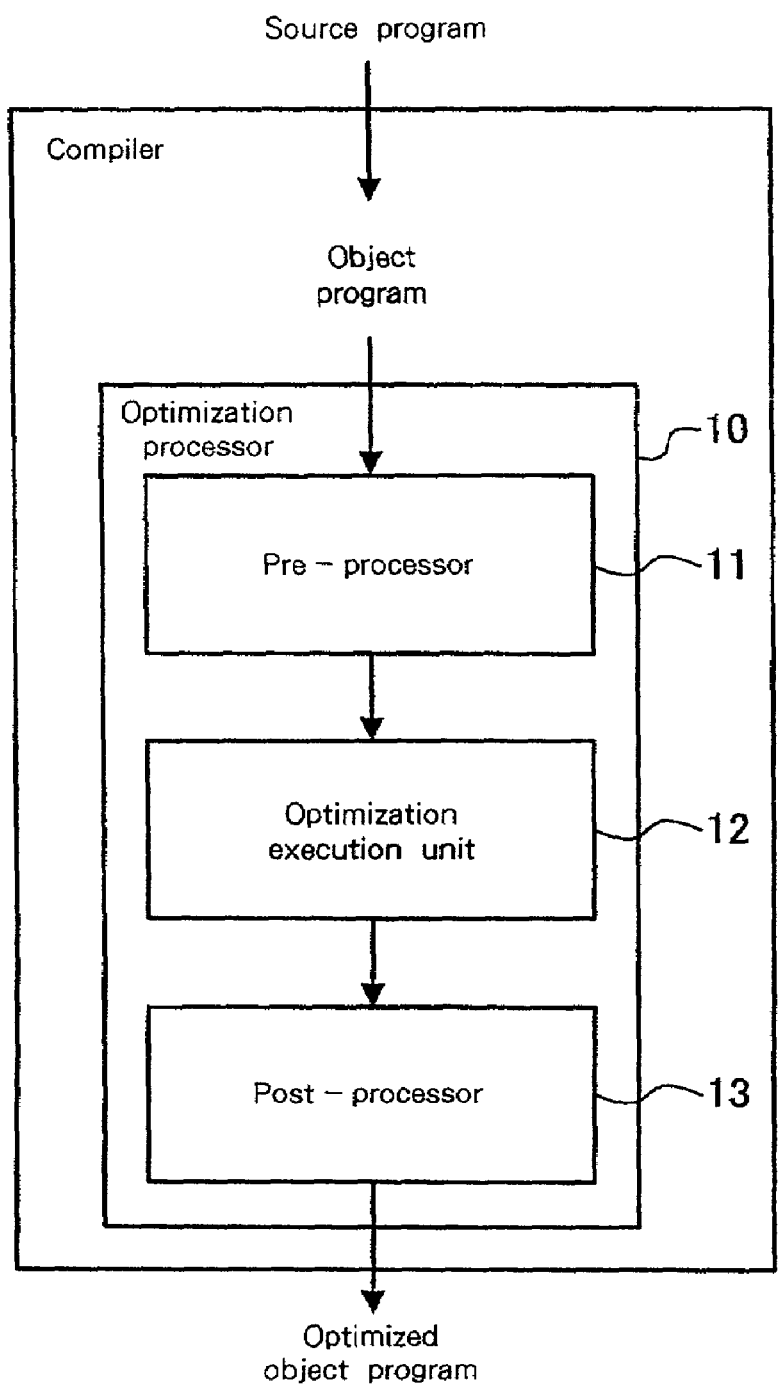
FIG. 2 is a diagram for explaining the configuration of an optimization processor in a compiler according to a first embodiment of the present invention.

FIG. 2 is a diagram for explaining the configuration of an optimization processor in a compiler according to a first embodiment of the invention.

In FIG. 2, an optimization processor 10 optimizes an object code (intermediate code) program written in a machine language. A pre-processor 11 creates a basic block to generate compensation code, and an optimization execution unit 12 performs a normal optimization process for an-object program that has been pre-processed. While a post-processor 13 sets compensation code in the basic block prepared by the pre-processor 11 in order to cope with an exception process.

In this embodiment, relative to a command that may cause an exception process in a program, as a basic block the pre-processor 11 establishes a Try-Catch block. In the Try-Catch block, the command that may cause an exception process is sandwiched between a Try node and a Catch node, and whether an exception process has occurred at the Try node is determined. Then, if an exception process has occurred, program control shifts to the process at the Catch node. In this fashion, compensation code is generated in the Catch node.

The optimization execution unit 12 performs an ordinary optimization process. And since, for the program to be optimized, the pre-processor 11 has prepared a Try-Catch block relative to a command that may cause an exception process, a special process for the command need not be performed while taking the exception process into account. As a result, effective optimization can be performed.

The post-processor 13 generates the compensation code that is required for the Catch node in the Try-Catch block, and when the compensation code is not required, the Try-Catch block created by the pre-processor 11 is removed. A case where the compensation code is not required is one where there is no difference between a command that may cause an exception process and an exception handler that ordinarily performs the exception process. In this case, as for the exception process 1 in FIG. 1, program control must merely be shifted to the exception handler. Thus, no compensation code is required, and in this embodiment the Try-Catch block is also unnecessary and is therefore removed from the program.

Figure 3:
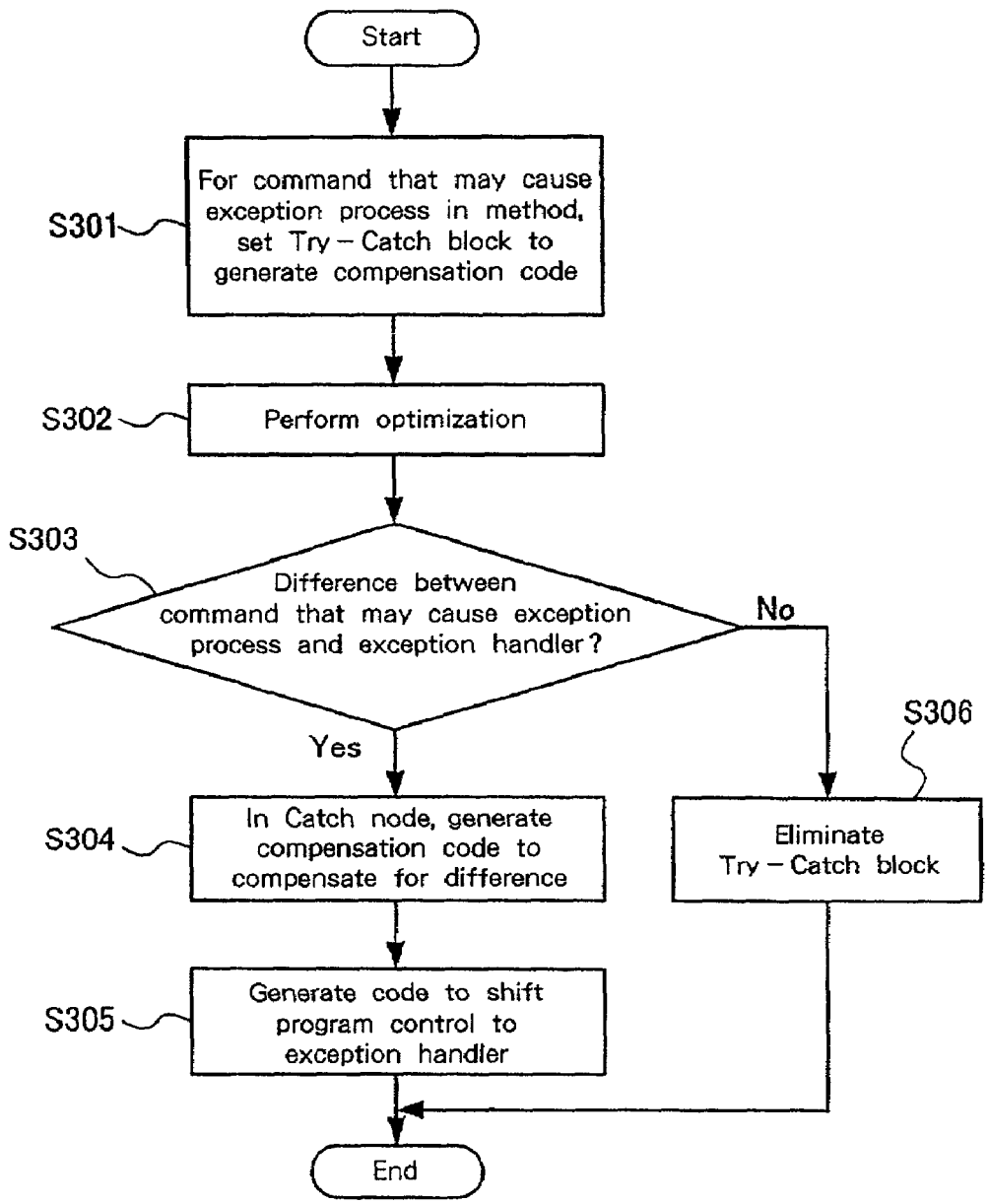
FIG. 3 is a flowchart for explaining the schematic optimization processing performed in accordance with the first embodiment.

FIG. 3 is a flowchart for explaining the schematic optimization processing performed for this embodiment.

In FIG. 3, when the object code (intermediate code) obtained by the conversion of a program is input to the optimization processor 10, the pre-processor 11 establishes a Try-Catch block in order to generate compensation code for a command that may cause an exception process in a method (step 301). The optimization execution unit 12 then performs the optimization process (step 302).

Subsequently the post-processor 13 examines the command that may cause an exception process and the exception handler to determine whether there is a difference in a register image and in the memory contents (step 303). If there is a difference, compensation code for compensating for the difference and code for shifting program control to the exception handler after the compensation code is obtained are generated in the Catch node of the Try-Catch block that is prepared by the pre-processor 11 (steps 304 and 305).

If there is no difference between the command that may cause an exception process and the exception handler, the Try-Catch block is removed (steps 303 and 306).

In this embodiment, when an exception process does not occur during the execution of the program that includes a command that may cause an exception process, an execution speed can be obtained that is equal to or higher than that achieved when the embodiment is not applied. And when an exception process occurs, the execution speed is reduced compared with when the embodiment is not applied. However, relative to the command that may cause an exception process, the frequency whereat an exception process does not occur is predicted to be much higher than the frequency whereat an exception process does occur, so that the reduction in the exception speed can be ignored.

The method used for finding the compensation code when an exception process occurs will now be explained. As is described above, in the embodiment, the Try-Catch block is employed for the insertion of the compensation block. For this, there is one conventional Try-Catch implementation method whereby one exception handler is provided for one Try node. According to this method, Try information is stored at the border of the Try node, and upon the occurrence of an exception process, detection of the exception handler is effected, based on the stored Try information.

When this embodiment is applied, however, the Try-Catch block for the insertion of the compensation code is generated for a command that may cause multiple exception processes in a method. At this time, if the conventional Try-Catch implementation method is employed to find the compensation code, the Try information must be stored at the border of the Try node, thereby reducing the execution speed.

In this embodiment, therefore, as the Try-Catch implementation method, a mechanism is introduced for employing the address of the point at which an exception occurred and the exception process type to detect a corresponding exception handler and to provide shifting program control for the detected exception handler. Such a mechanism can be used to avoid a reduction in the execution speed.

An explanation will now be given for a method used to shift program control away from the point at which an exception process has occurred to the exception handler for a Try-Catch block.

First, during the compiling process, for a command that may cause an exception process in a Try region, the post-processor 13 registers the address of the point at which the exception process occurs, the address of a corresponding exception handler and the exception type of the handler. When there are multiple exception handlers to which program control may be shifted when an exception process occurs in response to the command, all of these data are registered for each corresponding handler.

Then, during the execution of the program, the process used to shift program control away from the exception occurrence code to the exception handler is performed in the following manner.

First, when an exception process initially occurs in the method, a search is performed for the address of the point at which the exception occurred and the exception process type that is registered in order to obtain the address of the corresponding exception handler.

When the search is successful, program control is shifted to the detected exception handler.

But when the search fails, program control is shifted to the method that called the current method, and the search is continued.

According to this method, if an exception process does not occur, the execution speed can be increased compared with the conventional method according to which Try information is stored at the border of a conventional Try region. On the other hand, since a registration table is generated, the amount of code generated by the compiler can be increased more than in the conventional case. However, as is described above, when the post-processor 13 finds no difference between a command that may cause an exception process and an exception handler, i.e., when a modified program that provides no optimization effect is returned to its original form. Thus, the size of the registration table will not exceed a minimum required size, and accordingly, an increase in the amount of code can be minimized.

While referring to this embodiment, an explanation will now be given for a specific example in which the insertion of compensation code is performed in order to cope with an exception process.

First, an explanation will be given for a method, used to perform an ordinary register allocation for a Try region, that is used to allocate a variable to a register that is referred to following the exception handler.

When the insertion of the compensation code in this embodiment is applied as follows, an ordinary register allocation process can be performed in the Try region for the allocation, to a register, of a variable that is referred to following the exception handler. Thus, even when an exception process occurs, in the exception handler the compensation code generated by the compiler can be employed to correctly perform the processing.

First, information for a set of variables that are referred to following the exception handler is obtained for each Try region. Thereafter, in the Try region, an exception handler is designated for a command that may cause an exception process.

Furthermore, in the exception handler adjustment code, which is compensation code, is generated based on the set information that was first obtained.

At the last location at the exception handler, program control is shifted to the exception handler to which program control was originally to be shifted.

The above processing will now be described in more detail while referring to pseudo codes in FIGS. 4 to 7. In the following explanation, the value set for a variable is denoted by DEF, the use of the variable is represented by USE, and the identification number of the Try region is denoted by TRY.

First, assuming that DEF is present for all the local variables at the starting points of the exception handlers that correspond to the respective Try regions, a set of local variables, USE_VIA_EH_LIST[TRY], is obtained that refers to the DEFs. This operation consists of the following three operations, A to C. It should be noted that in the following explanation for the codes shown in FIGS. 4 to 7, reach[bbidx].in, reach[bbidx].out, reach.[bbidx].gen, and reach[bbidx].kill are sets, each of which consists of two elements, the identification number for a Try region and a local variable number.

A. For each basic block, reach[bbidx].gen and reach[bbidx].kill are obtained by using an algorithm shown in FIG. 4.

B. Then, data flow analyses using equations in FIG. 5 are performed by using gen and kill, which are obtained in operation A, to acquire a set reach[B].in such that the DEFs designated at the start points of the exception handlers reach the heads of the respective basic blocks.

C. Thereafter, based on an algorithm shown in FIG. 6, reach[B].in, which is obtained in operation B, is employed to obtain a set of local variables, USE_VIA_EH_LIST[TRY], that refer to the DEFs that have been set at the starting points of the exception handlers.

Figure 8:
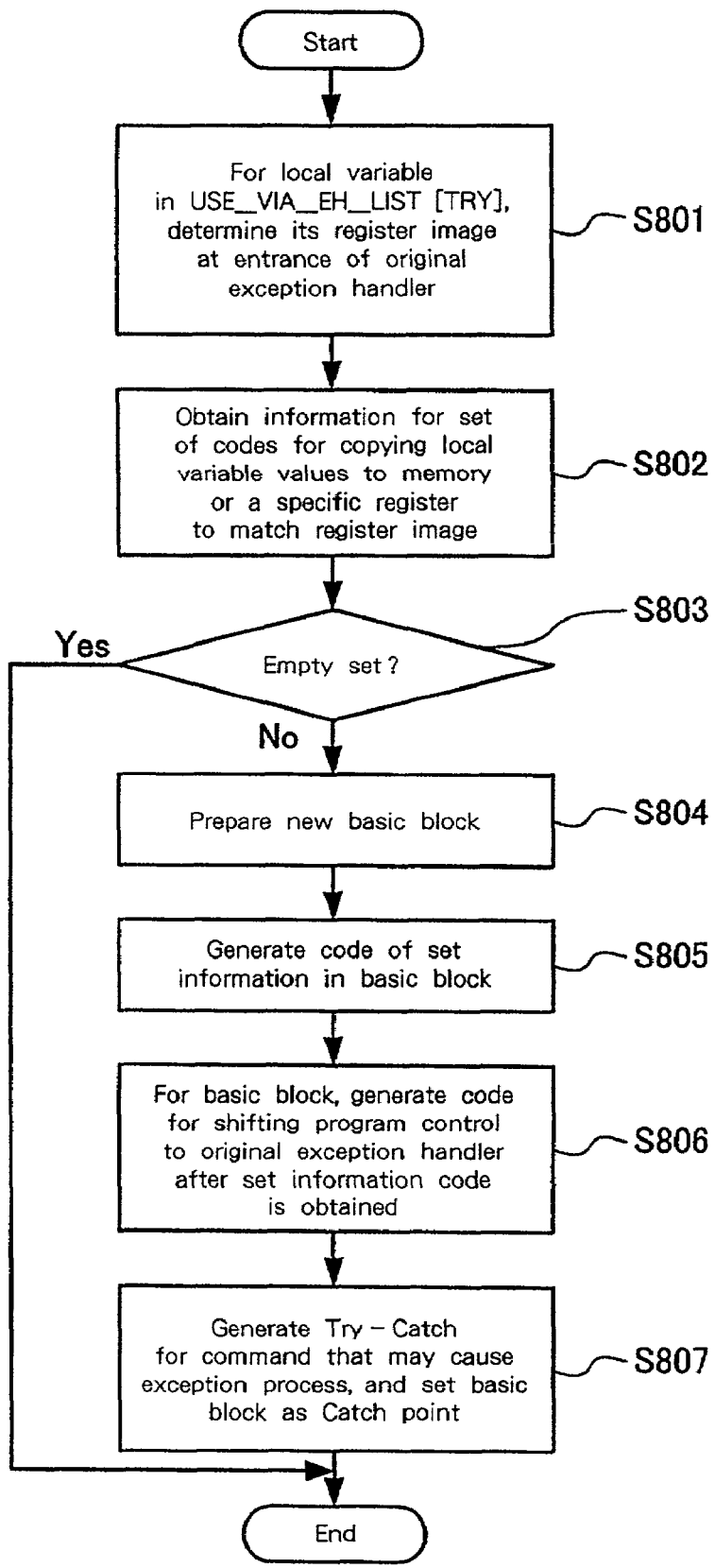
FIG. 8 is a flowchart for explaining the processing for <setting a new exception handler for this command> in the algorithm in FIG. 7.

A new exception handler is established by using an algorithm, shown in FIG. 7, for a command that causes an exception process in the method from which program control may reach a corresponding exception handler in Try region. FIG. 8 is a flowchart for explaining the processing for <setting a new exception handler for this command> using the algorithm in FIG. 7.

In FIG. 8, first, a register image at the entrance of the original exception handler is determined for a local variable in USE_VIA_EH_LIST[TRY] (step 801). Then, information for a set of codes is obtained so that the local variable values are copied to a memory or to a specific register in order to match the pertinent register image (step 802).

Following this, whether or not the obtained set information is an empty set is determined (step 803). If the set information is not an empty set, a new basic block is generated (step 804), and the code for the set information prepared at step 802 is generated in the basic block (step 805).

Then, the code for shifting program control from the code generated at step 805 to the original exception handler is generated for the basic block (step 806).

Finally, a Try-Catch block is generated for a command that may cause an exception process, and the basic block prepared at step 804 is set as a Catch point (step 807).

If at step 803 the set information obtained at step 802 is found to be an empty set, the processing is terminated without performing the processes following step 804.

Through the above processing, ordinary register allocation can be performed in the Try region for the allocation of a register for a variable that is referred to following the exception handler.

An explanation will now be given for a specific example for this embodiment wherein the execution speed for a program is increased by the insertion of compensation code.

FIG. 9 is a diagram showing a sample Java program for calculating the minimum value and the maximum value of an array. FIG. 10 is a diagram showing the state wherein the program in FIG. 9 is modified by the insertion of compensation code in accordance with the embodiment.

For the program in FIG. 9, first, a set of local variables, USE_VIA_EH_LIST[TRY], is obtained that refers to the DEFs designated at the starting points of the exception handlers. For local variables i and j, USE is shown in line (16) of the program, and for the minimum value min and the maximum value max, USE is shown in lines (19) and (20). DEFs set at the starting points for the exception handlers are destroyed in the lines (17) and (18).

As for a, size_x and size_y, no USE is provided following the exception handler, and therefore, USE_VIA_EH_LIST [TRY] consists of variables i and j. The register images of these two variables, i and j, at the entrance of the exception handler are defined as R1 and R2.

Next, a new exception handler is set.

In the Try region, commands that may cause exception processes that may reach a corresponding exception handler are those on lines (3) and (9). When the exception handler is set for these commands, the program is modified as is shown in FIG. 10. In FIG. 10, the commands are divided into small units, so that line (3) is represented by lines (3.1) to (3.4), and line (9) is indicated represented by lines (9.1) to (9.3). It should be noted that NULLCHECK represents an intermediate code for checking NULL, and SIZECHECK represents an intermediate code for checking the size of an array and an index.

Since the program in FIG. 9 is modified to obtain the program shown in FIG. 10, along a path whereat an exception process does not occur in the Try region, all the variables can be allocated for registers by employing the ordinary register allocation process.

As another example for this embodiment for the insertion of a compensation code to cope with an exception process, an explanation will now be given for a method for increasing the effects obtained by the optimization of a memory write command using the algorithm for partial redundancy elimination.

Figure 11:
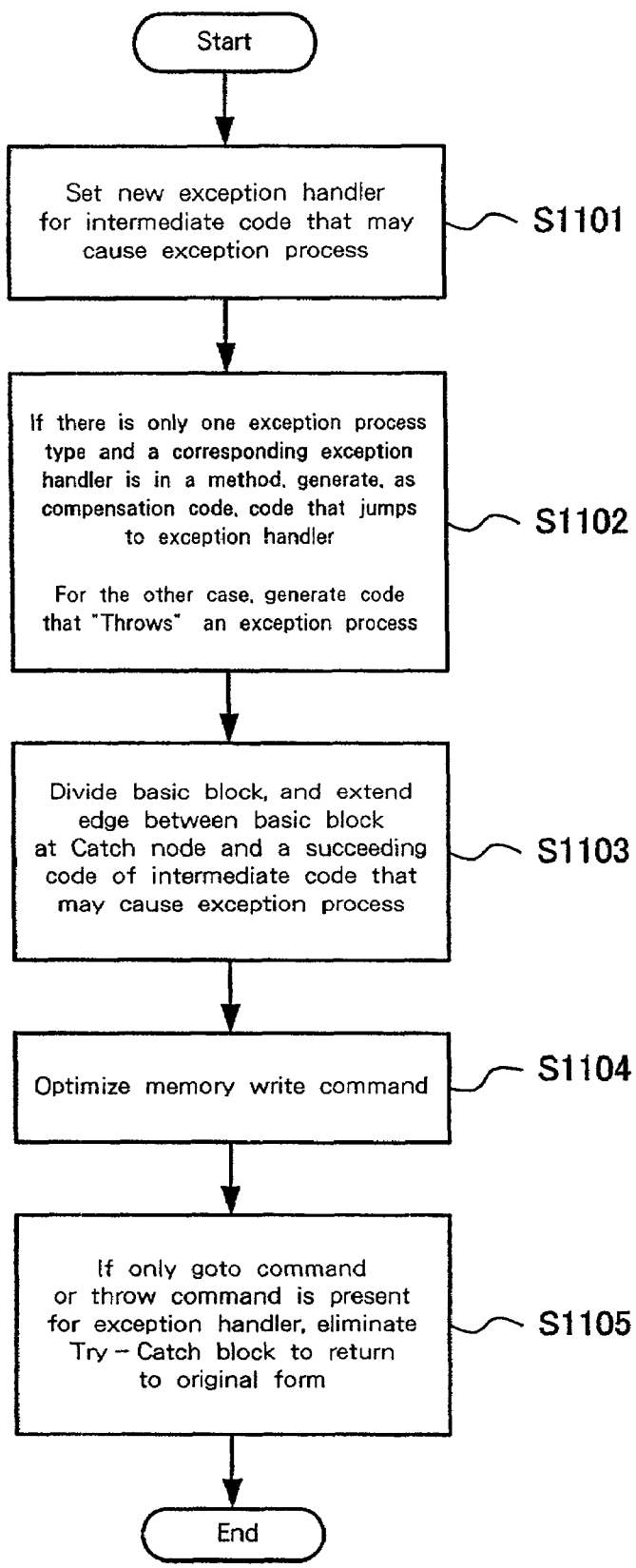
FIG. 11 is a flowchart for explaining a method for increasing the effects of optimization for a memory write command using a partial redundancy elimination algorithm, as another example, in accordance with the first embodiment, of the insertion of compensation code to cope with an exception process.

FIG. 11 is a flowchart for explaining the processing performed in this embodiment.

In FIG. 11, first, a new exception handler is set for intermediate code that may cause an exception process (step

1101). It should be noted that the exception handler is set so as to "catch" all the exceptions that may be caused due to the intermediate code.

If only one type of exception process may occur due to the intermediate code, and if a corresponding exception handler is originally present in the method, a code for jumping to the pertinent exception handler is generated as compensation code in the Catch node. In the other cases, code is generated for "throwing" a received exception process (step 1102).

Below the intermediate code, a basic block is divided that may cause an exception process, and the edge of a control flow graph is extended between the basic block at the Catch node and succeeding intermediate code for the intermediate code that may cause an exception process (step 1103).

Then, the memory write command is optimized for the control flow graph that is prepared at step 1103 (step 1104).

Finally, if only the "goto" command or the "throw" command generated at step 1102 is present in the basic block at the Catch node, the Try-Catch block is eliminated from the exception handler that is generated at step 1101, and the program is returned to the state before it was modified at steps 1101 to 1104 (step 1105).

Figure 12:
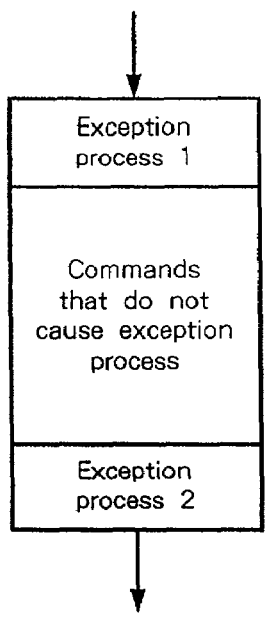
FIG. 12 is a diagram showing a control flow graph for a program that includes intermediate code that may cause an exception process.
Figure 13:
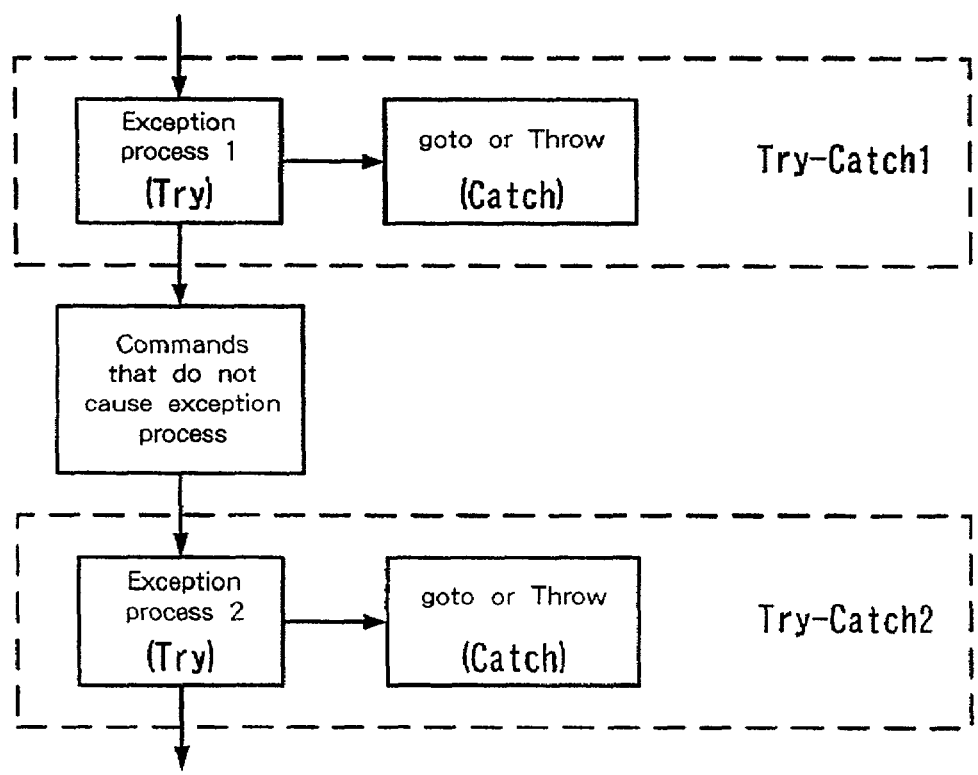
FIG. 13 is a diagram showing a control flow graph obtained by inserting compensation code into the control flow graph in FIG. 12.

FIG. 12 is a diagram showing a control flow graph for a program including intermediate code that may cause an exception process, and FIG. 13 is a diagram showing a control flow graph obtained through the processing in FIG. 11 in which the goto command or the Throw command, which is compensation code, is inserted into the control flow graph in FIG. 12.

An example for the optimization of the memory write command in accordance with the embodiment will now be described:

FIG. 14 is a diagram showing a sample Java program, and FIG. 15 is a diagram showing a program obtained by dividing the sample program in FIG. 14 into smaller processing units.

In the following explanation, a variable beginning with mem_ represents a variable in a memory, and a variable beginning with reg_ represents a variable in a register. In FIG. 15, NULLCHECK reg_a, which represents a process for determining whether a variable reg_a is NULL, is determined, and for, if the variable reg_a is NULL, performing a NullPointer exception, which is an exception process. SIZECHECK reg_pos, reg_a[ ] represents a process for determining whether $0 \leq reg\_pos < arraylength(reg\_a)$ is established, and for, if this is not established, performing an ArrayIndexOutOfBound exception, which is an exception process.

FIG. 16 is a diagram showing the state obtained by optimizing the program in FIG. 15 using the conventional method.

In FIG. 16, portions 1601 and 1602, which are written in italics, represent intermediate code to be executed in a loop. Since intermediate code that may cause an exception process are present in the loop, intermediate code ① can not be moved outside the loop.

FIG. 17 is a diagram showing the state wherein the compensation code is inserted into the program in FIG. 16 using the method of this embodiment.

In FIG. 17, a Try-Catch block is prepared for the intermediate code that may cause an exception process in the loop, and the exception processes received at the Catch node are thrown (see 1701 and 1702).

FIG. 18 is a diagram showing the state wherein, to optimize the memory write command, the partial redundancy elimination algorithm in FIG. 11 is employed for the program in FIG. 17.

In FIG. 18, portions 1801, 1802 and 1803, which are written in italics represent, intermediate codes to be executed in the loop when no exception process occurs. As for the path when an exception process does not occur, contrary to what is shown in FIG. 16, writing to memory is eliminated.

When an exception process occurs, writing to the memory is performed in accordance with the intermediate code (compensation code) in $\hat{1}$, and outside the loop, writing to the memory is performed in accordance with the intermediate code (compensation code) in $\hat{2}$, so that a correct operation is performed. When the exception process does not occur, there is no memory write command present in the loop, so that the execution speed is higher than in FIG. 16.

In the example in FIG. 18, since intermediate code, other than the "throw" command code, is entered in the basic block at the Catch node, the removal of the Try-Catch block at step 1105 in FIG. 11 is not performed. However, if only the intermediate code for the goto command or the throw command remains in the basic block at the Catch node, as is shown in FIG. 19, the Try-Catch block is removed.

As an additional example, in accordance with this embodiment, for the insertion of compensation code that can cope with an exception process, an explanation will now be given for the optimization of a memory write command related to the calling of a function.

Conventionally, the following three conditions must be ensured in order to optimize two memory write commands between which there is a function calling command.

1. In a function, no writing to a target memory is performed for optimization.

2. In a function, no reading from a target memory is performed for optimization.

3. In a function, no exception process occurs.

Especially for the third condition, when it is ascertained that an exception process may occur in the function, the optimization of all the memories is halted because the memories are treated as KILLed by the function. Thus, the optimization can not be performed by skipping almost all the called functions. When the control flow graph for calling a function is modified by inserting compensation code in accordance with the embodiment, an operation is performed to cope with the exception process that has occurred, so that the third condition "no exception process occurs in a function" need not be taken into account. Therefore, so long as the first and the second conditions are satisfied the optimization can be performed.

Even when the first and the second conditions are not satisfied, the optimization of all the memories is not halted, and only a memory whose condition is not ensured need be regarded as being KILLed in the data flow analysis. Thus, the optimization performance can be improved.

FIG. 20 is a diagram showing a program obtained by replacing with a function the array accessing portion of the sample program in FIG. 14. FIG. 21 is a diagram showing the state wherein, when it is found in the program in FIG. 20 that no writing and reading relative to mem_pos is present in the function func, compensation code is inserted in accordance with the embodiment to optimize the memory write command.

In FIG. 21, portions 2101, 2102 and 2103, which are written in italics, are those executed in the loop when an exception process does not occur. When the programs in FIGS. 20 and 21 are compared, it is found that the writing to mem_pos is eliminated from the loop.

SECOND EMBODIMENT

A second embodiment of the present invention will now be described:

The second embodiment of the invention has the same configuration as has the optimization processor 10 for the first embodiment in FIG. 2, i.e., it comprises a pre-processor 11, an optimization execution unit 12 and a post-processor 13.

In this embodiment, the pre-processor 11 divides a command that may cause an exception process in a program into a command that is a basic block for determining whether an exception process will occur, and a command that actually causes an exception process. These commands are clearly divided in the control flow graph. Then, when an exception process occurs, program control is shifted to the command that actually caused the exception process.

The optimization execution unit 12 performs an ordinary optimization process. The command in program to be optimized is divided by the pre-processor 11 into a command for determining whether an exception process will occur and a command that actually causes an exception process. Therefore, when an exception process does not occur, the processing is performed without taking an exception process into account (without traversing a path for the command that causes an exception process). As a result, an effective optimization process can be performed.

The post-processor 13 determines whether compensation code is generated in the basic block that includes the command that actually causes an exception process. When compensation code is not generated, the divided commands and the control flow graph are synthesized to return the program to its original state.

An explanation will now be given for a condition for performing this embodiment. There are roughly two methods used for mounting an exception check intermediate code that is used to determine whether an exception process will occur.

For the first method, hardware is employed to mount this code, and for the second method, a command is clearly issued for the testing for an exception process and for the separation of the control process at a conditional branch for a case wherein an exception process actually occurs as well as for a case wherein it does not occur.

According to the first method for which hardware is used, if array border checking is performed, and if an exception process does not occur, the processing speed would be reduced by using this embodiment. Therefore, in this embodiment, the second method is employed, and a command to clearly test for the exception process is issued to mount the exception check intermediate code.

Figure 22:
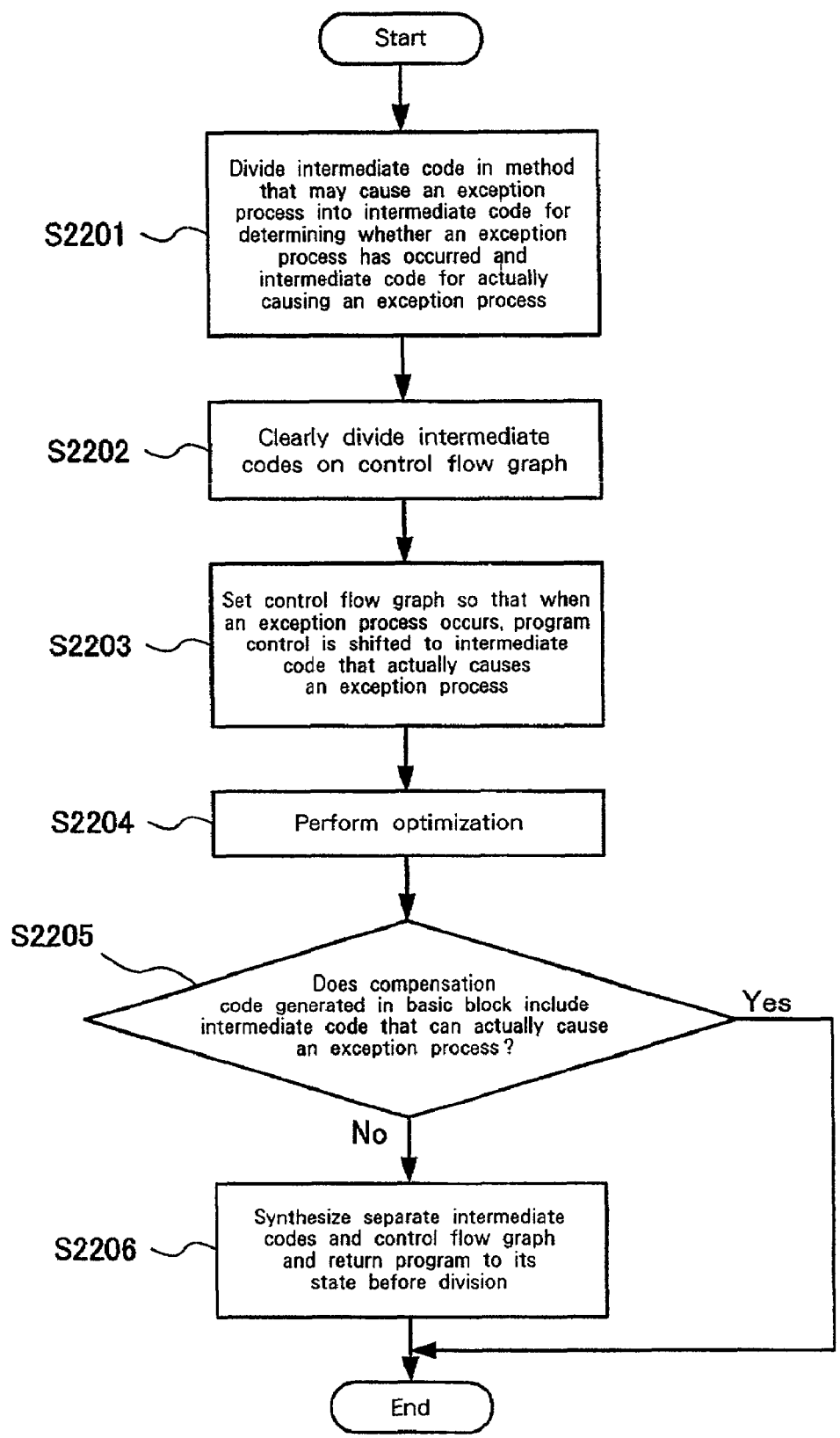
FIG. 22 is a flowchart showing the schematic optimization processing performed in accordance with a second embodiment.

FIG. 22 is a flowchart for explaining the schematic optimization processing performed for this embodiment.

In FIG. 22, when the object code (intermediate code) for a program enters the optimization processor 10, first, the pre-processor 11 divides the intermediate code, which may cause an exception process in a method, into intermediate code that determines whether an exception process will occur, and intermediate code that actually causes an exception process (step 2201). In the control flow graph, the intermediate code are clearly divided to obtain code for performing the two preceding functions (step 2202). Further, the control flow graph is modified so that when an exception process occurs program control is shifted to the intermediate code that actually caused the exception process (step 2203).

Following this, the optimization execution unit 12 performs the optimization process (step 2204).

Then, the post-processor 13 determines whether compensation code has been generated in a basic block that includes the intermediate code that was prepared by the pre-processor 11 and that actually caused the exception process (step 2205). When no compensation code is generated, the intermediate code that was divided by the pre-processor 11 and the control flow graph is synthesized to return the program to its original state (step 2206).

According to the embodiment, both when an exception process does not occur during the execution of the program, and when an exception process does occur, an execution speed can be obtained that is equal to or higher than the speed obtained when this embodiment is not employed. It should be noted, however, that an applicable command (exception check intermediate code) that causes the exception process is limited.

Therefore, this embodiment is employed together with the first embodiment, and specifically, the first and the second embodiments can be employed together in the following manner.

1. The exception check intermediate code for the program is modified by the method of the second embodiment, when this intermediate code consists of a portion for determining whether an exception process occurs at the object code level, and a portion that actually causes an exception process.
2. The other exception check intermediate codes are modified by the method of the first embodiment (method for using the Try-Catch block).
3. An ordinary optimization is performed.
4. A modified portion that was not an optimization target is returned to the original intermediate code.

As an example for this embodiment for inserting compensation code to cope with an exception process, an explanation will now be given for a method for increasing the effective optimization of a memory write command using the partial redundancy elimination algorithm, which has been explained for the first embodiment.

Figure 23:
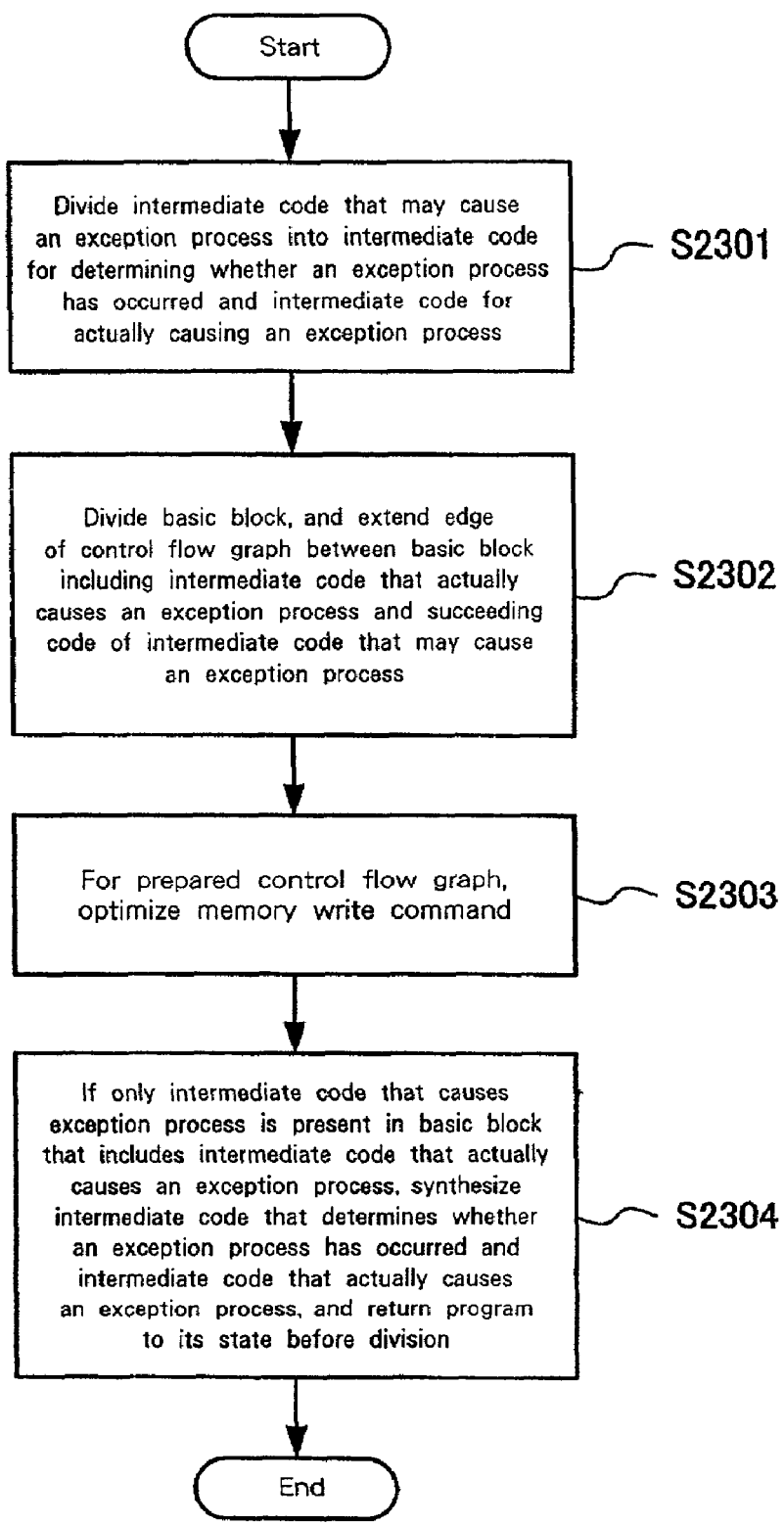
FIG. 23 is a flowchart for explaining a method for increasing the effects of the optimization of a memory write command using a partial redundancy elimination algorithm, as another example, in accordance with the first embodiment, of the insertion of compensation code to cope with an exception process.

FIG. 23 is a flowchart for explaining the processing performed for this embodiment.

In FIG. 23, intermediate code that may cause an exception process is divided to provide intermediate code for determining whether an exception process will occur, and intermediate code for actually causing an exception process (step 2301).

Then, the basic block is divided below the intermediate code to determine whether an exception process will occur, and the edge of the control flow graph is extended between the basic block, including the intermediate code that actually causes an exception process and succeeding intermediate code that may cause an exception process (step 2302). Then, when an exception process occurs, program control is shifted to the intermediate code that actually caused the exception process.

For the control flow graph prepared at step 2302, the memory write command is optimized (step 2303).

Finally, if only the intermediate code that causes the exception process is present in the basic block that is prepared at step 2301 and that includes the intermediate code for actually causing an exception process, the intermediate code for determining whether an exception process will occur and the intermediate code for actually causing an exception process are synthesized to return the program to its state before the division performed at step 2301 (step 2304).

Figure 24:
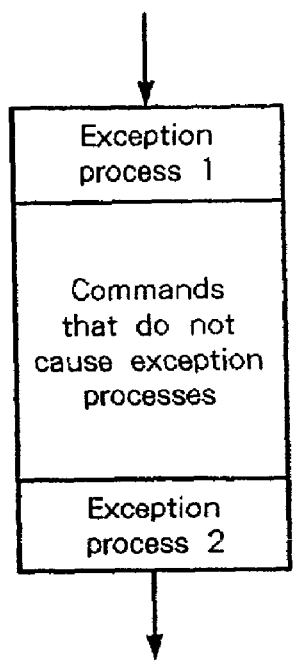
FIG. 24 is a diagram showing a control flow graph for a program that includes intermediate code that may cause an exception process.
Figure 25:
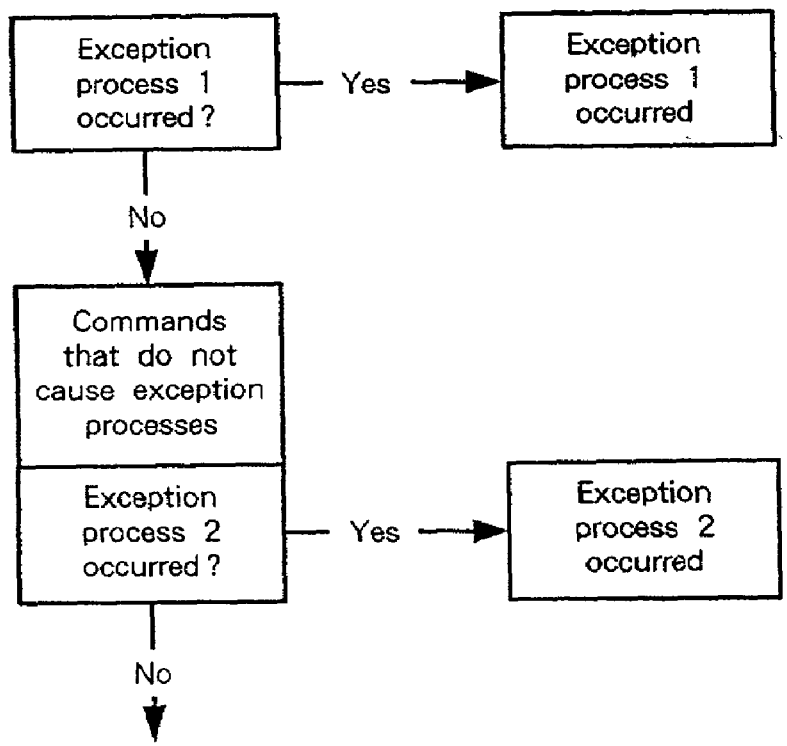
FIG. 25 is a diagram showing a control flow graph obtained by inserting compensation code into the control flow graph in FIG. 24 and by forming branches.

FIG. 24 is a diagram showing a control flow graph for a program that includes intermediate code that may cause an exception process, and FIG. 25 is a diagram showing a control flow graph obtained by inserting compensation codes in the control flow graph in FIG. 24 by employing the operation shown in FIG. 23 and by forming branches.

An explanation will now be given for a specific example for the optimization of a memory write command in accordance with the embodiment:

FIG. 26 is a diagram showing the state for this embodiment, wherein compensation code is inserted into the program shown in FIG. 16 that is obtained by performing the conventional optimization process for the sample program in FIG. 14.

In FIG. 26, intermediate code that may cause an exception process in the loop is divided into intermediate code SIZECHECK_FAIL, which determines whether the exception process will occur, and intermediate code SIZECHECK_EXCEPTION, which actually causes an exception process (see 2601 and 2602). SIZECHECK_FAIL represents the intermediate code that returns TRUE when an exception process will occur.

FIG. 27 is a diagram showing the state of the program in FIG. 26 wherein the memory write command is optimized by using the partial redundancy elimination algorithm in FIG. 23.

In FIG. 27, portions 2701, 2702 and 2703, which are written in italics, represent intermediate codes that are to be executed in the loop when an exception process does not occur. While taking into consideration path followed when an exception does not occur, compared with the program in FIG. 16, memory writing is eliminated.

When an exception process occurs, memory writing is performed in accordance with the intermediate code (compensation code) in ①, and memory writing is performed in accordance with the intermediate code (compensation code) in ②̂, outside the loop, so that the correct processing is performed. Further, when an exception process does not occur, compared with the program in FIG. 16, the execution speed can be increased because no memory write command is present in the loop.

In the example in FIG. 27, since intermediate codes other than the intermediate code that causes an exception process are entered in the basic block that includes the intermediate code that causes an exception process, the process at step 2304 in FIG. 23, for synthesizing the two sets of intermediate code and returning the program to the state that existed before it was divided, is not performed. However, if only the intermediate code that causes an exception process remains in the basic block that includes the intermediate code that causes an exception process, the program is returned to the state that existed before it was divided, as is shown in FIG. 28.

As is described above, according to the present invention, a program is so modified that an exception process is performed after compensation code is obtained. Therefore, an effective optimization process can be performed for a command that may cause an exception process.

What is claimed is:

1. An optimization method for optimizing a program to increase processing efficiency on a target machine, comprising the steps of:

establishing a basic block that includes a Try node for examining, in an object program, a command that may cause an exception process on the target machine to determine whether an exception process has occurred, and a Catch node for performing an inherent process when an exception process has occurred on the target machine;

performing optimization of said object program wherein said basic block is established;

examining said optimized object program to determine whether a difference in content exists between said command that may cause an exception process on the target machine and an exception handler whereat said exception process is performed; and generating in said Catch node of said basic block when a difference exists, a compensation code for compensating for said difference, and a code for, after said compensation code has been obtained, moving program control to said exception handler whereat said exception process is performed; and wherein said step of examining said object program to determine whether a difference in content exists between said command that may cause an exception process and said exception handler whereat said exception process is performed includes a step of;

removing said basic block prepared for said command that may cause an exception process when no difference in content exists.

2. An optimization method for optimizing a program to increase processing efficiency on a target machine, comprising the steps of:

dividing software code, in an object program, that may cause an exception process on the target machine into software code for determining whether an exception process has occurred and software code for actually causing an exception process;

specifying said code obtained at said division step as branches of a control flow graph;

designing said control flow graph so that when an exception process occurs on the target machine, program control is shifted to said code that actually caused said exception process;

performing said optimization process for said object program that has been modified;

determining whether code for compensating for a difference in content between the point of origin of an exception process and code for actually causing said exception process have been generated in a block that includes code for the actual performance of said exception process after the optimization process has been run; and using said control flow graphs, when said code for compensating for said content difference is not generated, for synthesizing said two code sets to obtain said code arrangement that existed before said code was divided.

* * * * *

UNITED STATES PATENT AND TRADEMARK OFFICE
CERTIFICATE OF CORRECTION

PATENT NO. : 7,058,935 B2
APPLICATION NO. : 09/814324
DATED : June 6, 2006
INVENTOR(S) : Motohiro Kawahito et al.

It is certified that error appears in the above-identified patent and that said Letters Patent is hereby corrected as shown below:

Column 3, Line 16:
"of-origin of an" should read --of origin of an--

Column 14, Line 9:

"in $\hat{1}$, and outside" should read --in ①, and outside--

Column 14, Line 11:

"in $\hat{2}$, so that a" should read -- in ②, so that a--

Column 17, Line 35:

" $\hat{2}$, outside the loop" should read -- ②, outside the loop--

Signed and Sealed this

Twenty-eighth Day of November, 2006

JON W. DUDAS
*Director of the United States Patent and Trademark Office*